Feb. 18, 1958     P. D. WURZBURGER     2,823,935
PIPE COUPLING WITH DEFORMABLE RING FOR FLARELESS PIPE

Filed Jan. 23, 1953                            2 Sheets—Sheet 1

INVENTOR.
PAUL D. WURZBURGER

BY
ATTORNEYS

Feb. 18, 1958    P. D. WURZBURGER    2,823,935
PIPE COUPLING WITH DEFORMABLE RING FOR FLARELESS PIPE
Filed Jan. 23, 1953    2 Sheets-Sheet 2

*INVENTOR.*
PAUL D. WURZBURGER
BY

ATTORNEYS

United States Patent Office 2,823,935
Patented Feb. 18, 1958

2,823,935
PIPE COUPLING WITH DEFORMABLE RING FOR FLARELESS PIPE

Paul D. Wurzburger, Cleveland Heights, Ohio

Application January 23, 1953, Serial No. 332,952

2 Claims. (Cl. 285—342)

This invention relates to improvements in the art of coupling and more particularly to tube or pipe couplings and fittings and the coupling elements thereof, and in certain aspects comprises an improvement upon my prior inventions, certain of which are disclosed in U. S. Patents Nos. 2,414,184, 2,417,536, 2,474,178 and my co-pending application Serial No. 160,374, filed May 5, 1950, now Patent No. 2,693,374 patented November 2, 1954.

It is among the objects of my invention to improve upon my own and other prior types of couplings and joints particularly as to fluid sealing and mechanical gripping virtues and facilities and, in addition, to provide the facility of a "close" coupling whereby the tube, piece or pipe to be coupled can be joined to or disconnected from the body or instrumentality with which it is connected or associated without substantial longitudinal motion or displacement; to provide a novel sealing and gripping element to seal and grip the tube to be coupled more effectively and without, or with less hazard, of constricting thin-walled tube undesirably or cutting into the wall of the tube more deeply than is necessary or desirable; to provide a coupling which during the operation of making the joint will reflect a "feel" to the operator that the joint has been completed as by a marked increase in wrench torque; to provide a coupling that does not necessarily require the provision of a flared mouth or conical camming surface interiorly of the body member but rather admits of employment or association with plain body members as well as with various standard forms of body members such as the body members of familiar compression and flared type fittings; to provide a coupling element useful in association with standard or flanged valve bodies and other instrumentalities without specially machining the same; to provide a coupling that is highly resistant to failure or deterioration from the deleterious influences of vibration; to provide a coupling having a cutting edge adapted to turn up a ridge of appreciable size from the wall of the tube or piece to be coupled wherewith to grip the same positively and securely, but also to restrict the depth of the cut and the size of the ridge and at the same time to grip and confine the ridge and to grip the tube adjacent the ridge and at a spaced distance from the cutting edge whereby to enhance the grip upon the tube and more firmly secure the tube mechanically and effect a more complete fluid seal and withal to limit more effectively the constriction of the tube incident to making the sealed joint.

Other objects include the provision of a gripping and sealing element within which actions and motions may be induced to effect a desirable apportionment of tube surface cutting, gripping, sealing and vibration resistant functions, and to provide for a separation of such functions when desired as making the fluid seal independently of the tube cutting and mechanical gripping. Another object is to provide a sealing and tube gripping element at least part of which may take a relatively fixed position with relation to the tube or pipe with which it is to be associated in the first instance and may by displacement and deformation of other parts of the element be worked into firm mechanical gripping and fluid sealing relation to the tube and for permanent attachment thereto for repeated connections and disconnections.

Another object is to provide a self-contained coupling element which within itself under the influence of longitudinally acting compressive forces converts and distributes those forces into gripping, cutting and sealing forces and motions to embrace the tube to be coupled and to substantially integrate the same in relation thereto. A further object is to provide a device which while having a principal utility as the coupling element for a tube coupling may also have additional utility not merely with tubes and coupling elements but also with other instrumentalities such as cylindrical rods, shafts, valve stems and the like upon which it may be desirable to substantially "integrate" external peripheral flanges or flanged projections for coaction with other instrumentalities, such as valve bonnets or glands, which may be related to it or them in more or less the same way that the familiar nut and body elements of the tube couplings are related to the coupled tubes, but not necessarily for the same purposes.

Other objects include the provision of means of accomplishment of the foregoing objects that are economical of manufacturing costs and facile, enduring and advantageous in use.

Other objects and advantages will more fully and at large appear from the following description of preferred and modified forms of my invention, reference being had to the accompanying drawings in which.

Figure 1:
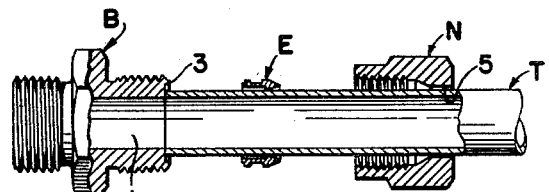
Figure 1 is an elevation partly in longitudinal section of an exemplary preferred form of my invention with the parts in assembled but spaced relation but prior to the working, coupling and joining thereof.

Referring now to the form of my invention shown in Figures 1 to 4 inclusive, there is shown an externally threaded body B to the rearward end of which the tube T is to be coupled and joined by the coaction of the internally threaded nut N between which and the body the coupling element E is worked into tube gripping and sealing relation and into sealing relation with the rearward end of the body. The body B has a bore 1 co-extensive with the bore of the tube T and of corresponding inside diameter. The rearward face 2 of the body may, to take advantage of my invention, be substantially flat and planar and lie normal to the axis of the bore of the body and thereby facilitate a "close" coupling. In the form of my invention shown in Figures 1 to 3 inclusive, I prefer that the rearward face 2 of the body have a small annular inwardly facing step or shoulder 3 which may be quite shallow, i. e. of the order of about five to ten thousandths of an inch depth; the step or shoulder 3 being so shallow as to not substantially impair the "closeness" of the coupling while, however, serving to receive the complementary step or shoulder 4 formed on the forward end of the coupling element E, see Figure 4, and center and locate the coupling element coaxially of the bore of the body and tend to resist radial expansion of the forward end of the coupling element E while the coupling element is being worked and after the joint has been made and the parts are subjected to the rigors of service. The rearward face 2 of the body serves as a longitudinal or axial abutment for the forward end of the tube T restraining it against axial movement toward the body and also serves as an abutment for the forward end of the coupling element E holding the forward end of the element against forward axial movement.

The nut N has a bore 5 coaxial with the axis of the bore of the body and coaxial of the tube and closely and freely encompassing the tube, and for particular coaction in my invention the nut has a forwardly facing inclined, preferably substantially conical female seat or camming shoulder 6 engageable with the complementarily formed male shoulder 7 on the outer and rearward end of the coupling element E. The nut N and body B are otherwise shown in their conventional forms and I shall use the terms nut and body to comprehend equivalent instrumentalities such as a flanged body and a flange ring specifically shown in my co-pending application, such a flanged body having, however, a rearward, preferably stepped, face corresponding to the face 2 and the flange ring having a caming shoulder corresponding to the shoulder 6, both for coaction with the element E and tube T as suggested above and more fully described below.

The coupling element E comprises a rearwardly disposed annular relatively thick ring part 10 having the outward and rearward inclined, preferably substantially conical surface 7 mentioned above, and comprises a forwardly disposed relatively thin walled tubular or sleeve part 11; the ring part engaging the nut, and the forward end of the sleeve part engaging the body. The ring and sleeve parts are preferably integrally formed as shown, preferably from rod stock or tubing, so as to have or be susceptible of acquiring the qualities of resilient yielding strength in the sleeve and constrictable toughness and hardness in the ring part to perform their respective offices and functions within my invention.

A main function of the ring part is to grip and engage the tube T with a strong mechanical grip and preferably also with a fluid tight seal. A main function of the sleeve part is to first offer sufficient axial resistance to movement of the ring part when the latter is engaged by the nut to develop inwardly acting radial components of force between the nut and the ring to induce constriction of the ring and its cutting edge 12, then secondly to yield both radially and axially to permit and induce inward radial and forward axial movement of the cutting edge into the wall of the tube so that the edge may turn up a ridge R of appreciable size, Fig. 3. Withal the sleeve part reacts between the nut and the body and effects a fluid tight seal with the rearward face of the body, and, as the sleeve part is foreshortened and buckled inwardly, cf. Figs. 2 and 3, it preferably forms a fluid tight seal with the ridge R and the adjacent wall of the tube. Conversely and complementarily the offices and functions of the ring part will be seen to include the transmission from the nut to the sleeve of axial components of force to compel the fluid seal between the sleeve and the body and to foreshorten the sleeve and concurrently to transmit radial components of force from the nut to the rearward end of the sleeve to induce its inward yielding and deflection incident to its foreshortening and/or buckling into sealing and gripping engagement with the tube and ridge while it is being foreshortened. A further function of the sleeve is, preferably, that it "bottoms" on the ridge and tube in the sense of affording a sharp increase in resistance to movement of the nut and ring when it has been foreshortened and buckled as shown in Fig. 3 thereby limiting the cutting action of the edge 12 and notifying the operator making the joint that the desired joint has been sufficiently made by reflecting a sharp increase in wrench torque applied to the nut.

Figure 4:
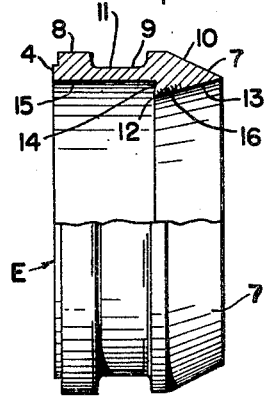
Figure 4 is an elevation partly in a longitudinal section of the coupling element of the form of my invention shown in Figures 1, 2 and 3.

Turning now more particularly to Figure 4 and the structure of the element E, the ring 10 thereof, departing from the specific disclosure of my co-pending application, has a tapered bore 13, preferably pitched at about 15° from the axis of the element. I have found this pitch for the bore to be satisfactory when the pitch of the surface 7 is opposite and about 30° from the same axis. The tapered bore 13 terminates at its forward end in the annular edge 12 which is circular, normal to the axis of the element and of diameter, preferably just neatly clearing the O. D. of the tube T and defined at the intersection of the forward end of the bore with the steeply pitched, preferably conical, surface 14; the latter being pitched in the same direction as the tapered bore 13 but at about 87°–88° from the same axis whereby to incline rearwardly and outwardly from the edge 13 about 2° or 3° from the plane of the edge 13 normal to the axis of the element. The edge 12 and the adjacent stock of the ring therefore comprises in effect an annular cutting tool with about 2°–3° rake angle, about 87° to 88° cutting angle and about 15° relief angle and clearance, regarding the tube as the work and the ridge R as the chip. Preferably the surface 7 of the ring is pitched at substantially the same angle, about 30°, as the surface 6 of the nut N so that when and as forcible advancement of the nut toward the body is induced the ring will be constrained to move bodily axially forwardly and radially inwardly and, withal, substantially coaxially of the nut, body and tube without, however, the marked rolling or tipping action as described in my co-pending application. This form of my invention tolerates reasonable departures from true conicalness of the surfaces 6 and 7 and from complete congruity of those surfaces to each other so long as such departures do not deleteriously modify the operation and results of my invention as revealed in this specification as a whole; it being recognizable, of course, that if the surface 6 of the nut is pitched a few degrees less than the surface 7 of the ring that the ring will tend to be rolled forwardly, following pro tanto the teaching of my copending application, decreasing the rake of the surface 14 and increasing the relief angle of the forward part of the bore 13. The converse tends to follow when the surface 6 is pitched a little steeper than the surface 7. Cadmium plating the nut and its surface 6 advantageously reduces friction between the surfaces 6 and 7.

The taper of the bore 13 facilitates the cutting action of the edge 12 when the ring is caused to have these combined movements by providing a desirable relief angle and clearance, permitting the edge 12 to bite into the external surface of the tube; the rake of the surface 14 facilitating the cutting and turning up the ridge R. The height and volume of the ridge R and consequently the depth of the cut into the tube T is restricted, inter alia, by the radial dimension of the raked face 14, i. e. by the diameter of the bore 15 of the sleeve 11 adjacent the face 14. For convenience and economy of manufacture the bore 15 may be of uniform diameter as shown.

Figure 3:
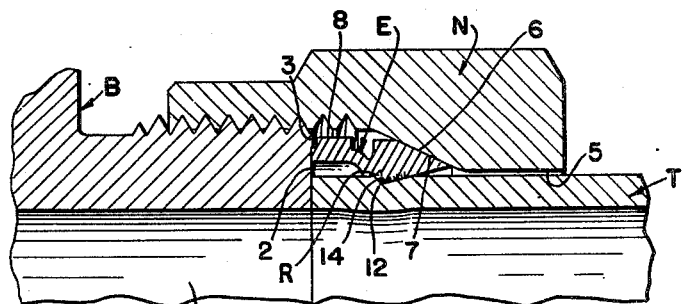
Figure 3 is a view corresponding to Figure 2 with, however, the parts in coupled and joined relation.

Radially outward of the edge 12 the ring 10 takes its maximum thickness and bodily mass whereby to overlie the edge and the face 14 both forwardly and rearwardly and afford good strength and support for the edge as a cutting tool and to back up and support the rearward end of the sleeve and to impose radial pressure upon it and upon the ridge R when the same is trapped and confined between the face 14 and the rearward end of the buckled or deflected bore 15 as shown in Figure 3. The external surface of the ring 10 may, to conserve radial space, be cylindrical as shown for a limited distance forwardly of the inclined surface 7; the surface 7 extending from the rear of the ring forwardly to a plane normal to the axis only a little rearwardly of the plane of the edge whereby to afford a wide bearing between the nut and the ring at and all around the points from which the radial and axial components of force reaching the edge emanate. These considerations, taken with the angles of pitch of the surface 6 and the bore 13 will tend to give the ring an effective axial length, measured from the line of intersection of the surfaces, not much longer than the thickness of the ring. The mean length of the ring, measured between a forward plane lying about half way between the edge and the extreme foremost part of the ring and a rearward plane approximately halving the inclined surfaces 7 and 13, is preferably about equal to or a little less than the full thickness of the ring.

Having regard for the material from which the element E is made the cutting action of the edge 12 may be enhanced with a desirable minimum of resistance to constriction and a minimum tendency to deleterious fracture, by hardening the surface of the tapered bore 13 for a limited area adjacent the edge 12 to a depth of from one to several thousandths of an inch as suggested by shading at 16, best shown in Fig. 4. Such hardening comprehends the geometrical line edge 12 and tends to extend one or more thousandths correspondingly up the face 14. The matter of choice of materials for the coupling element in relation to the material of the tube to be coupled and the desirable hardness of the edge 12 in relation to the hardness or softness of the tube is discussed more fully below.

The sleeve part of the element E in this form of my invention preferably has a radially thickened forward anchoring portion 8 with its forward face having the shallow annular step 4 proportioned to fit into and have centering and sealing engagement with the step 3 of the face 2 of the body. The thickened portion 8 with or without the interfit of the steps 3 and 4 tends to restrain the forward end of the sleeve 11 from radial expansion when the element E is worked between the nut and body. Between the anchoring portion 8 and the ring 10 the sleeve comprises a thin walled tubular, so-called bridge or resistantly yieldable portion 9 which is preferably several times longer than its wall thickness with its bore 15 exceeding the outside diameter of the tube by approximately twice the radial dimension of the face 14 to permit radial inward yielding and/or buckling of the "bridge" and radial inward cutting movement of the edge 12 until the rearward end of the bridge bottoms on or approaches substantial contact with the ridge R as the same is being or has been turned up across the face 14.

The material of which the coupling element may be made admits of a considerable choice depending in part upon the material and character of the tube to be coupled as well as the materials that are desired to be employed in the nut and body. My greater preference is to use S. A. E. 1117 steel for the stock of the coupling element because it is freely machinable and admits of case or surface hardening throughout all parts of the element including the bridge as well as the cutting edge or edges, without deleterious impairment of the flexibility and workability of the flexed and worked parts characteristic of the mode of operation of my coupling element. Using S. A. E. 1117 steel I do not necessarily harden the coupling element, other than work hardening by the necessary machining, so long as its cutting edge or edges are harder than the tube and/or body to be cut or bit, see Fig. 6. With steel or stainless steel or other harder tubes the wholly surface hardened S. A. E. 1117 steel coupling element provides satisfactory cutting edges and preserves desirable workability in the other parts of the element. My lesser preference is to use other free machining steels for the coupling element and, when used with tubing and/ or tubes and bodies that are harder than the unhardened element, to confine the hardening of the element to limited areas adjacent the cutting edge or edges. Using aluminum body, nut and tube, or steel or brass nuts and bodies with copper tube, for example, the coupling element E may be made of such steel and not hardened so long as it is of greater hardness than the tube to be coupled and, in the form of Figs. 5–7, preferably harder than the body to aid the bite of the edge 20 into or against the body. On steel tubes I may use a steel coupling element of similar hardness but of free machinability, which after being machined and formed is given a light case hardening preferably only on the surface adjacent the edge as in the area 16 as by cyaniding and carbo-nitriding to have a case of as little as one to two thousandths inches deep. Dealing with stainless steel tubing, I find it practicable to harden the cutting edge and area 16 more deeply and to a greater degree of hardness while largely avoiding hardening of the bridge and the rest of the coupling element. Confining the hardening to a limited area may be done by copper plating the whole element lightly and then scuffing off the plating at the area 16, or plating all the exterior of the element except the area 16, before submitting the element to a case hardening treatment whereby to confine the hardening substantially to the desired limited area and the cutting edge or edges.

To facilitate understanding and practice of my invention an example of size and proportion of the coupling element of my invention is stated by way of further illustration and exemplification, as follows:

For ½" O. D. tube the diameter of the edge 12 need exceed ½" only by enough to take care of variations in commercial tolerance of the tube and coupling element to afford a free sliding fit. The O. D. of the anchoring portion 8 and ring 10 is about .670" to .680". The portion 8 is about .06" to .08" long and the length of the bridge on the outer surface is about .110" long, and, the sleeve as measured along the bore 15 from the face 14 to the forward end is about .200" long. The radial depth of the surface 14, i. e. the height of the bridge above the edge 12 is about .03", except as the same may be reduced somewhat to preserve extra thin-walled tubing. The thickness of the bridge is about .016" to .018" and the depth of the groove above the bridge between the outer part of the ring and the anchor is about .0385". The outer cylindrical surface of the ring is about .03" long. The overall mean length of the ring is not much greater than or substantially the same as its thickness. While the drawing in Figure 4 is not necessarily exactly at scale, I have undertaken to make it correspond substantially to the preferred end exemplary dimensions and proportions here given. For tubes of greater and smaller size my experience has been that all the dimensions above stated should not necessarily be modified proportionately for the best practice of my invention. For example in making a coupling element for a one inch tube the bores and the external diameters of the ring and abutment might well be approximately doubled in respect to the ½" size and the overall length might be moderately increased as in the anchor and ring, but the length and thickness of the bridge and its spacing from the tube may well be kept about the same as in the ½" size although the mean diameter of the bridge would have to be approximately doubled as compared with the ½" size. It will also be appreciated that the length of the bridge, while maintaining its desired relative thickness, and the radial spacing particularly of the rearward end of the bridge from the edge 12 may and preferably should be modified to increase or decrease the depth of the cut desired by the edge 12 (especially in the form of my invention shown in Figs. 1–4 incl.) with due regard to the wall thickness and quality of the material of the tube to be coupled and the service and pressure to which the coupling is to be subjected.

My preference that the angles of pitch of the surfaces 6 and 7 be about 30° and the pitch of the taper of the bore 13 (and 13a described below) be about 15° is stated because I have found such angles to be satisfactory in service and on test, both in respect to desirably low wrench torque and efficient cutting, sealing and joining action. Those who understand the whole teaching of this specification will appreciate that flattening the angles of the shoulders 6 and 7 without other change, as down to 25°, will increase the radial component on the ring, edge and sleeve and correspondingly decrease the axial component and increase the travel of the nut in respect to movement of the edge 12. Such may well have advantage with tougher and thicker walled tubes. Conversely with the shoulders 6 and 7 at 35°, a workable and useful angle, opposite tendencies would prevail, inclining to advantage with softer and thinner walled tubes. Decreasing the pitch of the bore 13 as from 15° to 10°, other things being unchanged, would tend to require more axial travel of the ring and edge for the same depth of cut and would tend to increase the bodily constriction of the tube and the area of forcible engagement between the tapered bore and the tube, a thing having desirable characteristics as for coupling a large diameter relatively soft thin-walled tube intended for use under circumstances where extra anti-vibration qualities were sought in the coupling. Increasing the pitch of the bore as from 15° to 20°, other things being equal would tend to have opposite effects and advantages for somewhat dissimilar purposes, such as getting a deep cut more quickly and less general grip between the bore and the tube.

Figure 2:
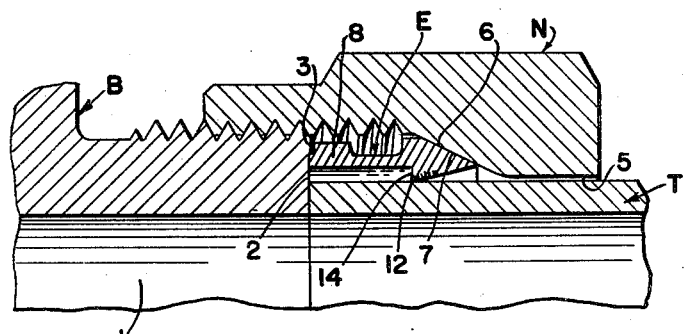
Figure 2 is an enlarged fragmentary longitudinal section showing the parts closely assembled but not worked.

The practice and operation of this form of my invention comprises that the parts be assembled in the relation and position shown in Figs. 1 and 2; the forward end of the tube and the forward end of the coupling element E abutting the body, the camming shoulder 6 of the nut contacting the shoulder 7 of the ring and the edge 12 substantially contacting the external surface of the tube. Thereupon the nut is forcibly advanced toward the body as through the threaded engagement therebetween and, consequently, the ring 10 with its edge 12 is simultaneously tended to be constricted inwardly and advanced axially relative to the tube and the body whilst the bridge 9 yieldingly resists axial movement of the ring sufficiently to compel its radial constriction and radial constriction of the edge 12. As the rearward end of the bridge yields to inward deflection and/or deflection and inward buckling with the constriction of the ring and cutting edge, axial forward movement of the ring and edge takes place. Cutting engagement between the edge 12 and the tube begins at once the edge is constricted into cutting engagement therewith and may and preferably does continue under the forcible urging of the nut until bottoming occurs between the rearward end of the bridge and the ridge R as the latter is turned up by the edge 12. A direct incident of this action is that the forward end of the element E is forced into fluid tight sealing relation with the rear face 2 of the body and the rearward end of the bridge as well as the edge 12 and face 14 and the forward part of the bore 13 have fluid tight sealing contact and engagement with the tube while especially the edge 12, face 14 and the forward end of the bore 13 have and acquire a strong blow-out proof mechanical engagement with the tube. Inter alia, the rearward end of the bridge and the forward end of the bore 13 engage the tube in opposition to forward movement of the tube thereby perfecting the engagement especially in resistance to loosening under pressure "impulse" test or service characterized by sharp changes in pressure from high to low and/or positive to negative.

The angle of taper of the bore 13 not only provides the relief and clearance to facilitate the action of the cutting edge described above but also substantially measures the radial squeeze and forcible engagement between the portion of the bore 13 which contacts the surface of the tube rearwardly of the cutting edge. When the bore 13 has a 15° taper, for which I have indicated a preference above, the surface of the bore immediately behind the cutting edge in its bearing upon the freshly cut surface of the tube tends to constrain the cutting edge to have a forward and inward motion in the surface or a cone pitched at 15° from the axis of the coupling. This path of motion of the cutting edge is, however, influenced not only by the pitch of the bore 13 but also by (1) the resistance of the tube wall to diametrical constriction, (2) the resistance of the tube wall to the cutting action of the edge 12, (3) the relative resistance of the bridge of the sleeve to axial foreshortening in relation to its resistance to radial inward deflection or bending, (4) the resistance of the ring 10 to radial constriction, and (5) the pitch of the surfaces 6 and 7 and therefore the direction of the resultant force imposed by the nut onto the ring. For example, if the bridge 9 is more highly resistant to axial foreshortening, as compared with the strength of the tube in resistance to diametrical constriction plus the resistance of the ring to diametrical constriction than I prefer, then the ring and edge 12 will tend to have relatively great radial inward movement compared with little axial movement and the bore will tend to have a wide constricting grip upon the correspondingly constricted but slightly cut wall of the tube. Toward the other extreme and by way of opposite example, were the bridge 9 more weak than I prefer in resistance to axial foreshortening in respect to a strong, tough tube highly resistant to cutting and with the ring having relatively high resistance to constriction, then the edge would tend to have much or too much axial motion with too little cutting or possibly so little cutting that the bore 13 might not engage the wall of the tube except at or closely adjacent the line of the edge 12. In the more desirable and more advantageous operation of my invention with the parts formed and proportioned with better regard to the service intended to be rendered by them as suggested above, the ideal resistance offered by the bridge 9 to axial motion of the edge 12, in this preferred form of my invention, will be somewhat greater than that which would induce the edge 12 to move forwardly and inwardly in the true surface of a 15° cone, such for example as tending to move the edge forwardly and inwardly in the surface of a 20° or 25° cone, and therefore the forward portion of the bore 13 will correspondingly tend to bear upon the external cut surface of the tube and resist the extra radial component of force which tends to deepen the cut and have tube gripping component and vibration dampening grip upon the wall of the tube of measurable force and value. As suggested in Figure 3, I prefer that approximately the forward half to three quarters of the bore 13, as a result of the considerations mentioned above, will have a firm, snug grip upon the external wall of the tube behind the cut when the joint is completed; the tightness of the grip tending to be greatest adjacent the edge and progressively less to the rearward end of contact between the bore and the tube.

Figure 5:
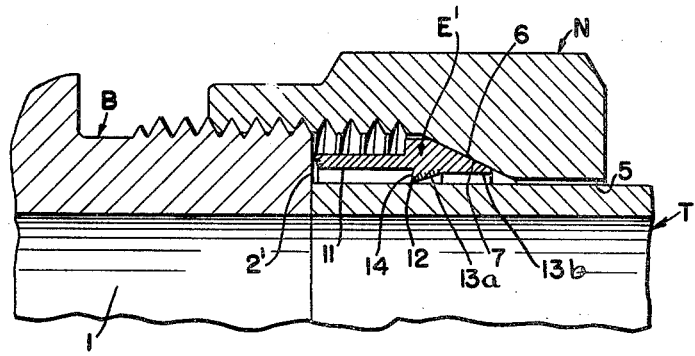
Figure 5 is a fragmentary longitudinal section similar to Figure 2 showing a modified form of my invention with the parts in assembled relation prior however to the final coupling and joining thereof.
Figure 6:
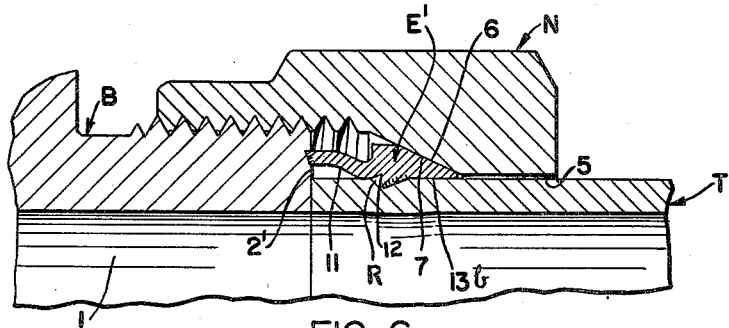
Figure 6 is a similar view with the parts in coupled and joined relation.
Figure 7:
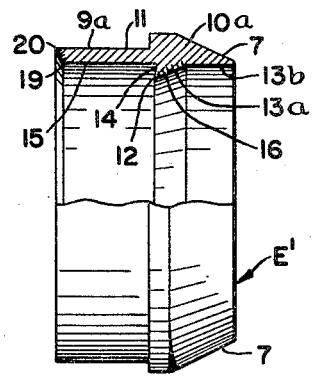
Figure 7 is an elevation partly in longitudinal section of the coupling element of Figures 5 and 6.

A modified form of my invention is shown in Figures 5 and 6 in which parts identical with those described in connection with the preferred form of my invention are referred to by the same reference characters or numbers. This form of my invention differs from the preferred form in certain features of the coupling element E′ which may be taken as substantially corresponding to the coupling element E above described except that in the coupling element E′ the ring 10a has its bore 13a—13b specifically different from the bore 13 of th ring 10, and in the coupling element E′ the sleeve and bridge part 9a are co-extensive and terminate at the forward end of the coupling element in a bevelled face 19 which is preferably hardened and terminates outwardly in a cutting edge 20 adapted to cut into the rearward flush face 2′ of the body B and make its own seat, Figs. 5 and 6. The forward portion 13a of the bore of the ring 10a may correspond entirely to the corresponding portion of the bore 13 of the coupling element E, lying in the surface of a 15° cone and having that surface hardened adjacent to and rearwardly the cutting edge 12 as above described. This conical portion 13a of the bore of the ring may extend rearwardly from the cutting edge from about ⅓ to ½ the whole length of the bore and therebehind the bore may take cylindrical form as at 13b coaxial with the conical bore 13a and with the coupling element as a whole. Otherwise the ring 10a may substantially correspond to the ring 10 above described.

The sleeve and bridge element 9a may substantially correspond to the bridge element 9 above described except that in this form of my invention I prefer that it be of substantial uniform wall thickness throughout terminating at its forward end in the hardened cutting edge mentioned above.

In the operation and practice of this form of my invention the parts will perform substantially the same offices and functions as those above described except that the edge 20 at the forward end of the sleeve will under the influence of pressure from the nut cut its own seat and the flush face 2' of the body B and effect a fluid tight seal therewith and gain resistance to radial expansion by its biting and cutting engagement with the rearward face and the body. Under the same influence of force and motion from the nut the ring 10a will move axially forwardly and radially inwardly carrying its cutting edge 12 into cutting engagement with the exterior surface of the tube T while these motions are facilitated by the resistant yielding of the sleeve and bridge 9a as above described.

In this form of my invention, however, when the parts approach the state shown in Figure 6 the cylindrical portion 13b of the bore of the ring 10a will come into contact with a corresponding length of the external surface of the tube T and as the tube is more firmly and snugly engaged by this cylindrical portion of the bore further constriction of the ring 10a will tend to be abruptly halted. This is a "bottoming" effect reflected in a sharp increase in wrench torque and signalling the completion of the joint and also gives a firm, snug, vibration dampening grip between the whole length of the ring portion 10a and the tube throughout a greater area than tends to be obtained in the form of my invention first above described for the same depth of cut.

As suggested in Figure 6 the "bottoming" that is effected by engagement between the cylindrical portion 13b of the bore of the ring 10a with the tube is preferably substantially simultaneous with the "bottoming" of the rearward end of the sleeve or bridge 9a upon the ridge R and the adjacent part of the tube. The bottoming of the ring, however, need not be simultaneous with the bottoming of the rearward end of the bore of the sleeve since one of the facilities of this form of my invention is that by reducing the diameter of the bore 13b as compared with the bore 11 of the sleeve, bottoming may be effected exclusively through the ring thereby limiting the depth of the cut and stopping the cutting operation before the bridge or sleeve 9a is necessarily buckled to the extent shown in Figure 6. By the same token the sleeve 9a need not be located to necessarily limit the radial dimension of the face 14 for the purpose of limiting the size of the ridge R but may join the forward face of the ring 10a at a different place which need not necessarily be selected with regard to the bottoming function of the sleeve or bridge.

While I have illustrated and described a preferred and modified form of my invention, changes, other modifications and improvements will occur to those skilled in the art who come to understand its uses and advantages, and therefore I do not care to be limited to the specific forms or illustrations of my invention herein specifically disclosed nor in any manner inconsistent with the promotion of progress in this art marked by my invention.

I claim:

1. The tube coupling combination of a body having a rearwardly disposed end with which the tube is to be coupled for fluid communication, a coupling member associated with the body for forcible forward movement toward the body and having a bore encompassing the tube and having a forwardly facing forwardly and outwardly flaring substantially conical camming shoulder pitched at from about 25° to 35° to the axis of the member, a coupling element encompassing the tube between the body and said shoulder and having a forward end engaging the body and a forwardly facing internally disposed and rearwardly relieved cutting edge closely adjacent the tube and remote from the forward end of the element and said element being adapted to be worked between the body and said shoulder with appreciable forward and inward tube cutting motion of said edge relative to the forward end of the element to cut a groove in the tube and turn up a ridge of appreciable size and into sealing engagement with the tube and the body, and means holding the tube against substantial forward motion while said coupling element is being worked, said coupling element comprising a rearward ring part embracing said cutting edge and engageable by said shoulder and movable thereby relative to said forward end and appreciably forwardly toward said end, and comprising a deformable axially and radially flexible portion joining and disposed between said end and said ring part and yieldably admitting motion of said ring part toward said end when said shoulder is forcibly moved toward the body, said ring part having a tapered bore adjacent and flaring rearwardly and outwardly from said edge and affording a relief angle for and behind said edge of about half the pitch of said shoulder and having an inner forwardly disposed and forwardly facing substantially radial surface intersecting the bore at said edge, said ring part being relatively axially inflexible in relation to said flexible portion and having an outer and rearwardly disposed inclined substantially conical bearing surface complimentary and juxtaposed to said shoulder and pitched at substantially the same angle as said shoulder and slidably engageable therewith, said flexible portion having sufficient strength in resistance to forward motion of said ring part to first induce constriction of said cutting edge and cutting engagement with the tube under the forcible influence of said shoulder upon said bearing surface, and said flexible portion thereafter yielding both axially and radially with constriction of said cutting edge and forcibly yielding to forward axial motion of said ring part relative to the forward end of the element and to forward axial and inward radial motion of said cutting edge under the forcible influence of said shoulder upon said bearing surface whereby to cut a groove in the tube of appreciable length and depth and turn up a ridge of appreciable size.

2. A tube coupling, comprising in combination a body with a rearward end to which the tube is to be coupled, radially thick, axially short and axially substantially inflexible ring means having an inwardly and forwardly tapered substantially conical bore encircling the tube and having an inwardly and forwardly disposed substantially radial face forming with the bore a cutting edge closely encircling the tube and harder than the tube and spaced axially from said body and adapted to be forcibly constricted into cutting engagement with the tube and advanced axially forwardly toward said body and relative to the tube and cut a groove in and turn up a ridge of appreciable size from the exterior of the tube, and said ring means having an outwardly and rearwardly disposed, inwardly and rearwardly inclined substantially conical bearing surface pitched at an acute angle to the axis of the ring means and pitched oppositely of the said tapered bore and pitched more steeply than the pitch of said tapered bore and with at least a foremost portion of said bearing surface located axially near and radially remote from said cutting edge, means for controlling the motion of said cutting edge and being disposed between said body and said ring means and encircling the tube and yieldably resisting motion of said edge toward said body and having a forward end substantially axially immovably associated with said body and a rearward end integrally joining said ring means with radial clearance from said cutting edge, and said last named means having an axially flexible portion proportioned axially long and radially thin compared with said ring means and having resistance to axial compression conducive of radial deflection when stressed axially and radially and having diminished resistance to axial compression with radial deflection admitting forced axial motion of said ring means toward said forward end with radial constriction of said ring means and said cutting edge, and means having a camming shoulder complimentary and juxtaposed to said inclined bearing surface and pitched at approximately the same angle to said axis and forcibly engageable with said bearing surface for imposing axially forward and radially inward forces on said ring means to initially constrict said edge to cutting engagement with the tube and simultaneously deflect said portion and thereafter increase the constriction of said edge and the deflection of said portion and simultaneously foreshorten said portion and advance said edge whereby to cut a groove of appreciable length and depth in said tube and turn up a ridge of appreciable size.

References Cited in the file of this patent

UNITED STATES PATENTS

| | | |
|---|---|---|
| 2,171,217 | Kreidel | Aug. 29, 1939 |
| 2,201,404 | Kreidel | May 21, 1940 |
| 2,211,856 | Kreidel | Aug. 20, 1940 |
| 2,452,278 | Woodling | Oct. 26, 1948 |
| 2,522,785 | Hanson | Sept. 19, 1950 |
| 2,585,453 | Gallagher | Feb. 12, 1952 |
| 2,640,716 | Bigelow | June 2, 1953 |
| 2,641,487 | La Marre | June 9, 1953 |
| 2,693,374 | Wurzburger | Nov. 2, 1954 |